United States Patent
Rahim (10) Patent No.: US 7,965,675 B2
(45) Date of Patent: Jun. 21, 2011

(54) SYSTEM AND METHOD FOR DETECTING AN UNLICENSED MOBILE ALLIANCE (UMA) SERVICE IN GSM WIRELESS COMMUNICATION NETWORKS

(75) Inventor: Nighat Rahim, Mount Prospect, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1222 days.

(21) Appl. No.: 11/210,030

(22) Filed: Aug. 22, 2005

(65) Prior Publication Data
US 2007/0060125 A1 Mar. 15, 2007

(51) Int. Cl.
*H04W 4/00* (2009.01)
(52) U.S. Cl. .................................................. 370/328
(58) Field of Classification Search .......... 370/401, 370/465, 351, 352, 328, 238
See application file for complete search history.

(56) References Cited

U.S. PATENT DOCUMENTS

| | | | |
|---|---|---|---|
| 6,493,824 B1 * | 12/2002 | Novoa et al. | 713/162 |
| 6,901,276 B1 | 5/2005 | Skinner et al. | |
| 6,985,811 B2 * | 1/2006 | Gronemeyer | 701/213 |
| 7,155,242 B1 * | 12/2006 | MacKenzie et al. | 455/466 |
| 7,363,051 B2 * | 4/2008 | Bridgelall | 455/553.1 |
| 2002/0082010 A1 | 6/2002 | Koorapaty et al. | |
| 2002/0106997 A1 | 8/2002 | Barber et al. | |
| 2005/0034001 A1 * | 2/2005 | Pontarelli | 713/320 |
| 2005/0105496 A1 * | 5/2005 | Ambrosino | 370/338 |
| 2005/0147073 A1 * | 7/2005 | Hietalahti et al. | 370/338 |
| 2005/0176420 A1 * | 8/2005 | Graves et al. | 455/424 |
| 2006/0280128 A1 * | 12/2006 | Abdel-Kader | 370/254 |

FOREIGN PATENT DOCUMENTS
WO 2004042941 A1 5/2004

OTHER PUBLICATIONS

Mark Edward Pecen, System Selection in Wireless Communications Networks, U.S. Appl. No. 10/824,550, filed Apr. 14, 2004.
International Search Report PCT/US2006/026385 dated Oct. 10, 2006.

* cited by examiner

Primary Examiner — Chirag G Shah
Assistant Examiner — Otis L Thompson, Jr.

(57) ABSTRACT

Techniques are provided for scanning for access points with a wireless communication device including a baseband processor and a WLAN processor. A data download command which defines a preferred network list can be sent from the baseband processor to the WLAN processor. In addition, a first scan command can be sent from the baseband processor which triggers the WLAN processor to independently begin periodically scanning a number channels.

34 Claims, 5 Drawing Sheets

SYSTEM AND METHOD FOR DETECTING AN UNLICENSED MOBILE ALLIANCE (UMA) SERVICE IN GSM WIRELESS COMMUNICATION NETWORKS

TECHNICAL FIELD OF THE INVENTION

The present disclosure relates generally to wireless communications, and more particularly to the rapid detection of UMA services by wireless communications devices (WCDs) capable of operating in different communications systems, for example, in cellular communications networks like GSM and in broadband WLANs like 802.11, SIP protocols, IMS protocols, and methods therefor.

BACKGROUND OF THE INVENTION

Hybrid wireless cellular communications devices (WCDs) are capable of communicating on both cellular networks and in broadband wireless networks, such as, 802.11 protocol-based or WLAN-based networks. As the WCD moves physically and/or the fading channel changes due to subtle variations in the complexity of the physical surroundings, the WCD supports a specific set of logical decision-making capabilities which determine how a cell and/or network will be selected. Generally, a hybrid WCD may detect and select one network or the other, or both.

Broadband wireless communication protocols support radio resource management techniques for detecting one or more operating frequencies and access points. A cellular system, such as Global System for Mobile telecommunication (GSM), however, has little in common with alternate radio access interfaces, for example, a standardized WLAN like 802.11 or other wireless technologies, capable of meeting the requirements for operation in unlicensed spectrum. The differences in radio behavior result primarily from differences in operating bandwidth, power limitations for unlicensed operation, Medium Access Control (MAC) protocol (either reservation-based or contention-based) designed to handle different predominant traffic types, frequency range of operation and accordingly, the resulting difference in radio propagation characteristics and the interference environment for licensed/unlicensed operation.

When a dual mode WCD moves from a cell where it is communicating with a Mobile Switching Center (MSC) of a GSM network to another cell where a UMA network is the preferred network, the WCD operates in a UMA preferred mode. The WCD will attempt to handover to an Unlicensed Network Controller (UNC) that operates over unlicensed IP spectrum. When a WCD is in a UMA preferred mode of operation, at power up, the WCD scans for access points within a UMA network. According to some specifications, when a WCD is operating in a UMA preferred mode of operation, the WCD should be capable of discovering or detecting an access point of the UMA network within a short time (e.g., 15 seconds) after entering into it, and associating with the UMA network within another short time (e.g., 15 to 30 seconds) after detecting the access point.

According to one approach, the WCD continuously scans for access points to discover its preferred networks. The host baseband processor of the WCD wakes up every predetermined scanning interval to continuously scan for access points. The host baseband processor then goes to sleep after initiating the scan until the next scanning interval when the host processor is awoken to scan again. Scan results are returned to the host baseband processor if an access point is detected. However, executing this entire scan procedure at such short time intervals (e.g., every 15-20 seconds) can in many cases unnecessarily wakeup the host baseband processor to process scan information for access points that may not be available for association. The two processor blocks and their associated software blocks are awakened or activated during each scanning interval. This requires a large number of commands and a great deal of communication between the various sub-modules of the host baseband processor, which in turn results in a significant amount of communication overhead being passed between the various modules. Using this approach to detect an access point within a UMA network can consume substantial current and battery power.

The various aspects, features and advantages of the disclosure will become more fully apparent to those having ordinary skill in the art upon careful consideration of the following Detailed Description thereof with the accompanying drawings described below.

DETAILED DESCRIPTION OF THE INVENTION

Aspects of the following description relate to techniques for optimizing the use of WLAN hardware and reducing overhead typically associated with continuous WLAN scanning protocols. In contrast to "continuous" scanning, "private" scanning techniques are provided which only activate WLAN firmware in the WLAN chipset to execute a more precise or low power scanning based on SSIDs or BSSIDs. The low power scanning technique is more precise and faster since only a fixed number of channels (e.g., 11 or 13 channels) need to be scanned during each scanning interval (e.g., approximately every 30 seconds). Moreover, the other software modules in the baseband processor remain in deep sleep mode (DSM) and are not activated during this low power scanning technique. As such, a significant amount of battery power can be saved since these modules do not need to be activated and therefore do not consume current resources.

When an AP is not detected on a first attempt, all of the blocks in the baseband processsor go into a "deep sleep" mode. At this point, only the WLAN device, specifically WLAN IC hardware/firmware, is activated, signaled or triggered to start scanning at a periodic interval (e.g., every 25 to 30 seconds).

In one implementation, the baseband processor sends a user's preferred list of SSIDs or BSSIDs of APs which should be scanned for. This lets the WCD enter preferred mode, allowing the user to select the specific APs (BSSIDs). This information is passed to the WLAN device. Next, all other blocks in the baseband processor enter deep sleep mode, and remain in deep sleep mode until a BSSID of a preferred network (selected by the user) is detected or matched during WLAN scanning Significantly, the only module which is active during this "low power" scanning is the WLAN firmware, and only single command is required to initiate this low power scanning technique. When a BSSID of a preferred network (selected by the user) is matched and the WLAN scanning result is returned, then a GPIO (General Purpose Input/Output) is triggered which activates or "wakes up" the host baseband processor and lets the host baseband processor know that it must send an appropriate scan command.

Figure 1:
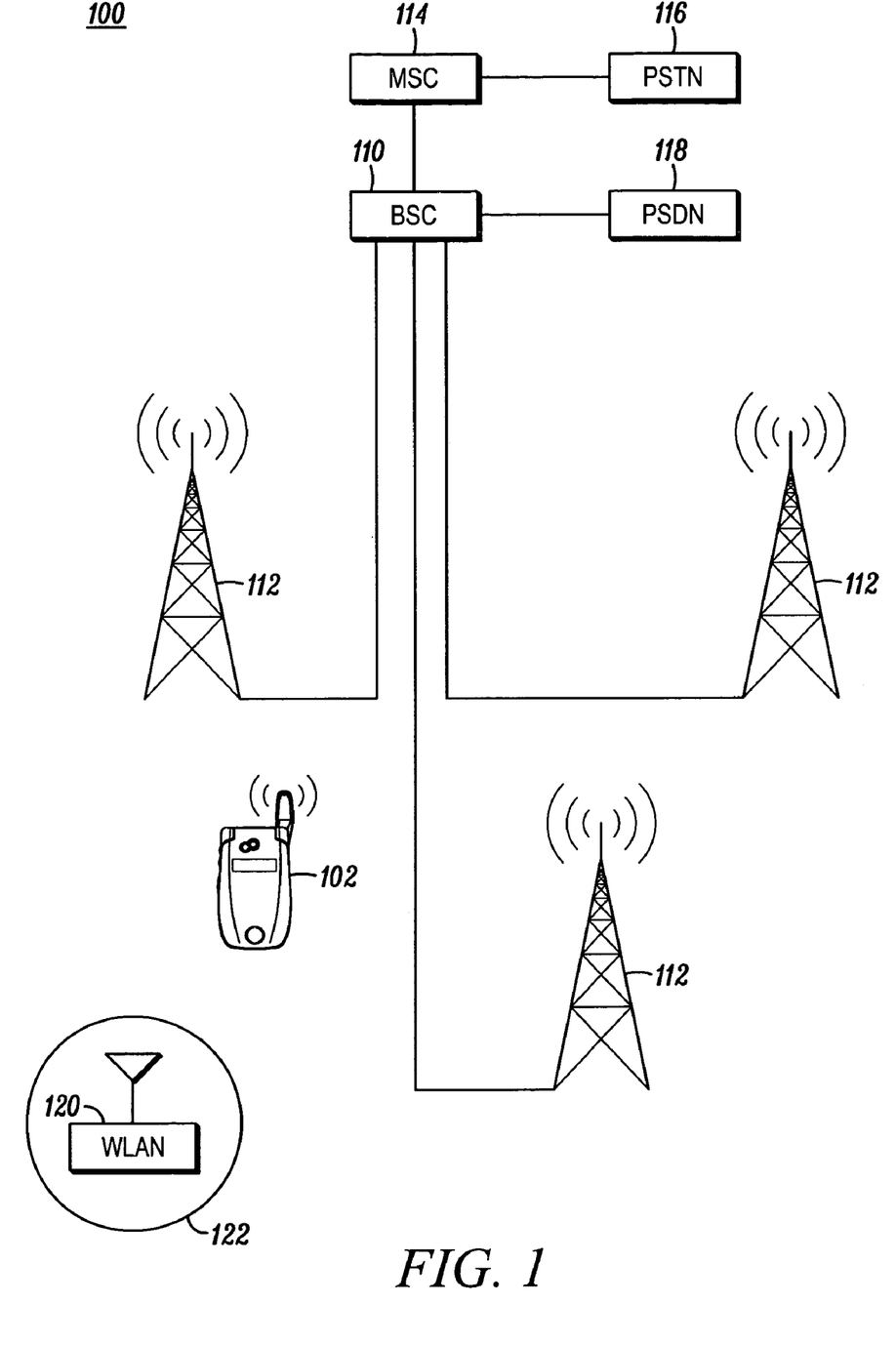
FIG. 1 is an exemplary wireless communications network including cellular and broadband wireless systems.

FIG. 1 illustrates a hybrid wireless communications device 102 operating in a wireless communications network 100 comprising first and second generally different communication systems. The exemplary first system is a cellular communications network or system, for example, a Global System for Mobile communications (GSM) comprising a base station controller (BSC) 110 coupled to a plurality of base transceiver stations (BTS) 112 and to a mobile switching center (MSC) 114 interconnecting the BSC to a Public Switched Telephone Network (PSTN) 116. The exemplary cellular communications system is coupled to a data network, for example, a General Packet Radio Service (GPRS) or some other Packet/Public Switched Data (PSDN) 118 network by infrastructure well known to those having ordinary skill in the art. The exemplary cellular communications system may also be coupled to other entities and infrastructure, for example, messaging and/or presence servers not illustrated but also well known by those having ordinary skill in the art. In other embodiments, the cellular communications network may be some other protocol network, for example, a CDMA network or a $3^{rd}$ Generation (3G) W-CDMA network, or a combination of 2G and 3 G networks, among others.

In FIG. 1, the exemplary second system is a broadband wireless communications network, for example, a wireless local area network (WLAN) 120. Alternatively, the broadband wireless communications network may be a canopy or other fixed wireless network. The broadband wireless network may be proprietary or standardized protocol, for example, an 802.11 protocol network or some other wireless technology capable of meeting the requirements of operation in unlicensed spectrum. In other embodiments, more generally, the second system may be some other network, which is generally isolated relative to the cellular network.

Figure 2:
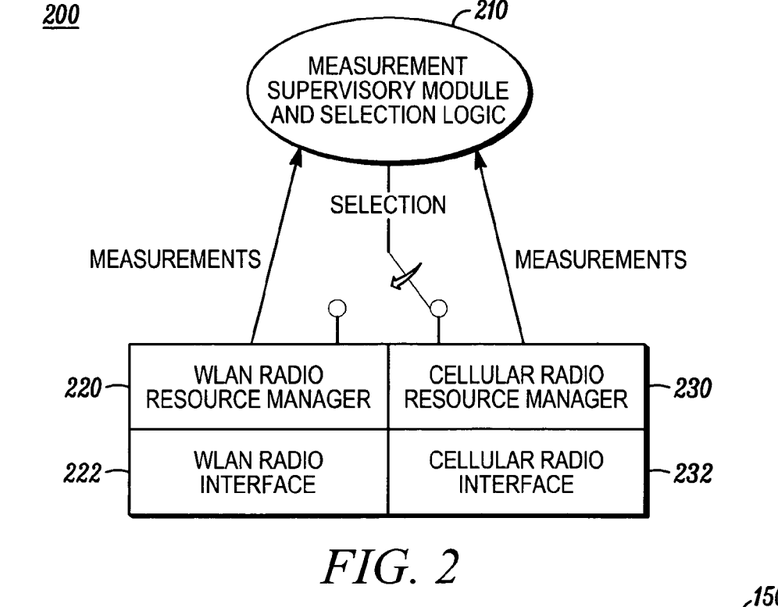
FIG. 2 illustrates an exemplary architecture for a hybrid wireless communication device.
Figure 3:
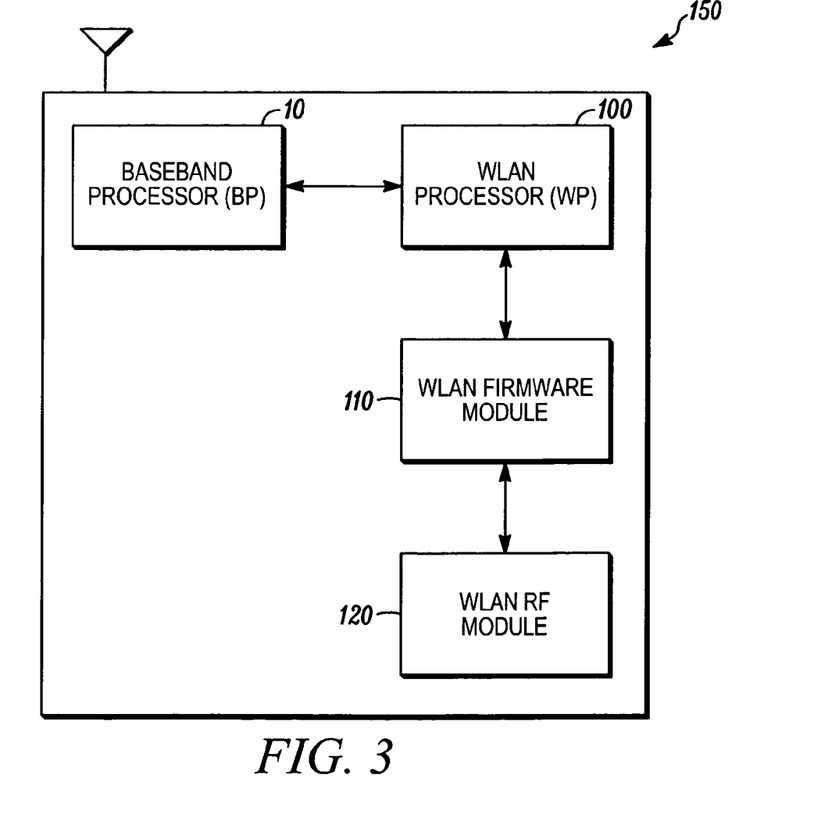
FIG. 3 is a block diagram showing components and modules of a wireless communication device (WCD)

FIG. 2 illustrates a portion of a wireless communications device architecture 200 comprises a supervisory entity 210 that manages wireless signal measurements and communications system selection logic. The exemplary architecture includes a WLAN radio resource manager 220 coupled to a WLAN radio interface 222 and a cellular radio resource manager 230 coupled to a cellular radio interface 232 that will be WLAN URR The radio resource managers 220 and 230 communicate signal measurements to the management entity 210, and the management entity controls the selection and monitoring of the first and second radio systems based on signal measurement information, as discussed further below. In other embodiments, the radio resource management and interface entities may be different than those of the exemplary embodiment. FIG. 3 is a block diagram showing components and modules of a wireless communication device (WCD) 150. The WCD 150 comprises a baseband processor (BP) 10, a WLAN processor (WP) 100, a WLAN firmware module 110, and a WLAN RF module 120. The WCD 150 includes two main processor blocks which are the baseband processor (BP) 10 and WLAN processor (WP) 100 as well as its associated software blocks involved in scanning for access points in a WLAN, for example, when making a VoIP call.

The baseband processor (BP) 10 generates a data download command (DDC) comprising a preferred network list (PNL), and a private scan command (PSC). The preferred network list (PNL) defines a list of preferred identifiers (SSIDs/BSSIDs) and determines scanning criteria for use by the WLAN processor (WP) 100. The baseband processor (BP) 10 generates the private scan command (PSC) when the baseband processor (BP) 10 enters deep sleep mode. In deepsleep mode, the processor core frequency is scaled down to reduce current consumption as the processor is only required to maintain its state and not to process any application. The baseband processor (BP) 10 can also generate a configure wake-up command (CWUC) which defines the conditions as to when the WLAN processor (WP) 100 should generate a wake-up command (WUC) to be sent to the baseband processor (BP) 10 to awaken it from DSM. In one implementation, the configure wake-up command (CWUC) specifies that the baseband processor (BP) 10 is to be awoke when one of the detected identifier (SSID/BSSID) matches one of the preferred identifiers (SSIDs/BSSIDs).

The WLAN processor (WP) 100 receives the data download command (DDC) and the private scan command (PSC) from the baseband processor (BP) 10. The private scan command (PSC) informs the WLAN processor (WP) 100 that the baseband processor (BP) 10 is entering deep sleep mode, and triggers the WLAN processor (WP) 100 to independently begin periodically scanning a number of channels. In one implementation, the WLAN processor (WP) 100, responsive to the private scan command (PSC), begins periodically scanning a number of channels for each preferred identifier (SSID/BSSID) at a defined scanning interval. During intervals between the defined scanning interval the baseband processor (BP) 10 enters into a low power mode (LPM). In the low power mode, the WLAN processor sends active probes for each SSID and processes some data, for example, only data that takes less then 20 msec per channel. The processor then goes to deep sleep mode instead of passive scan mode where WLAN processor will be on for the entire 100_msec beacon period for each channel. As the WLAN processor (WP) 100 detects identifiers (SSIDs/BSSIDs), it compares each detected identifier (SSID/BSSID) to the list of preferred identifiers (SSIDs/BSSIDs) to determine whether the detected identifiers (SSIDs/BSSIDs) match one of the preferred identifiers (SSIDs/BSSIDs). The WLAN processor (WP) 100 ignores or discards detected identifiers (SSIDs/BSSIDs) which do not match a preferred identifier.

Using the configure wake-up command (CWUC) criteria, the WLAN processor (WP) 100 knows when it should generate a wake-up command (WUC) to be sent to the baseband processor (BP) 10. For example, if the WLAN processor (WP) 100 finds a match between one of the detected identifiers (SSIDs/BSSIDs) and one of the preferred identifiers (SSIDs/BSSIDs), then the WLAN processor (WP) 100 can generate and send the wake-up command (WUC) to the baseband processor (BP) 10.

Figure 4:
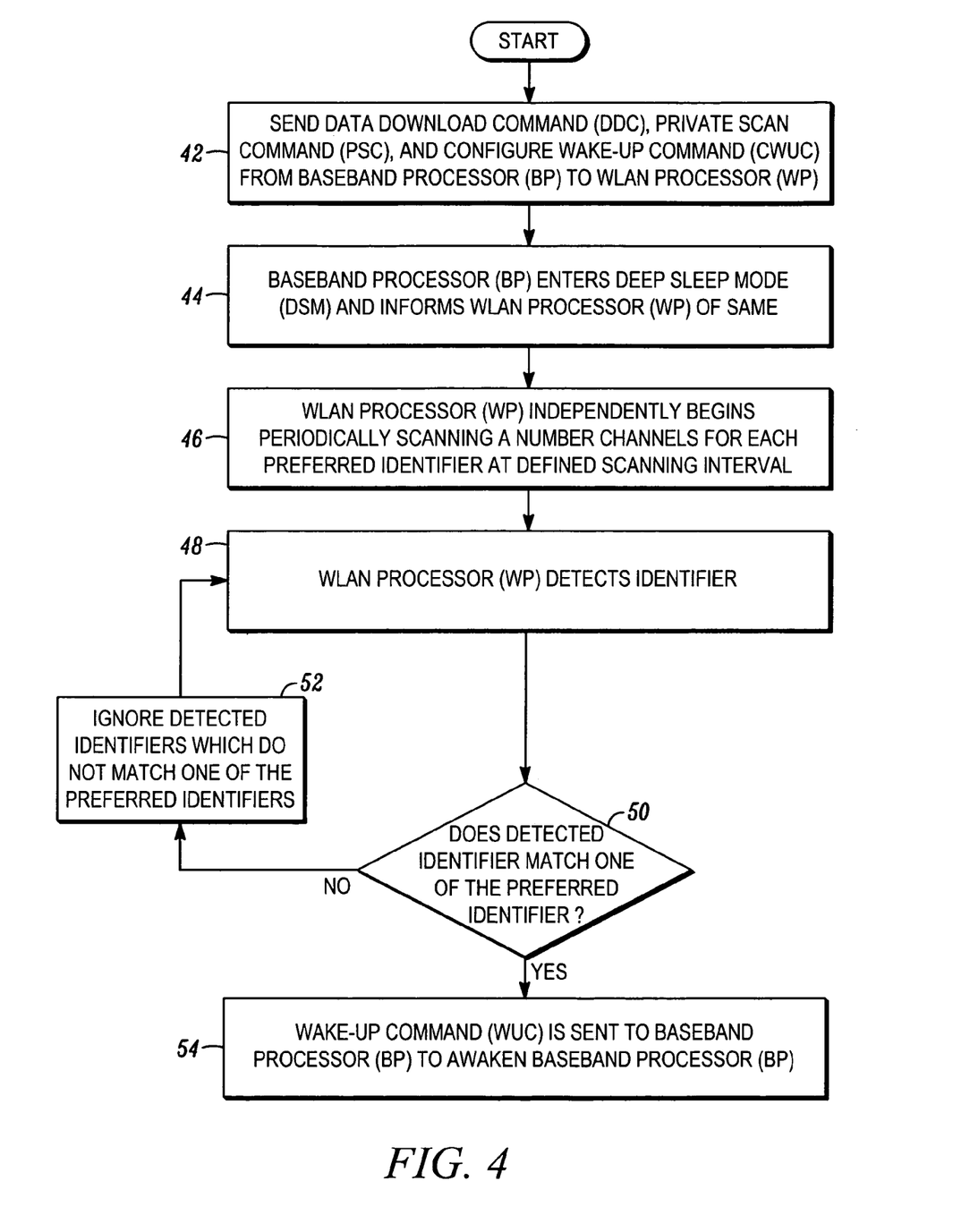
FIG. 4 is a flowchart showing a method for scanning for an access point with the WCD of FIG. 3.

FIG. 4 is a flowchart showing a method for scanning for an access point with the WCD of FIG. 3.

At step S42, a data download command (DDC), a private scan command (PSC), and optionally a configure wake-up command (CWUC) are sent from the baseband processor (BP) 10 to the WLAN processor (WP) 100. At step S44, the baseband processor (BP) 10 enters deep sleep mode (DSM) and informs the WLAN processor (WP) 100 that the baseband processor (BP) 10 is entering deep sleep mode (DSM). At step S46, the WLAN processor (WP) 100 independently begins periodically scanning a number channels for each preferred identifier (SSID/BSSID) at a defined scanning interval without waiting for a second scan command from the baseband processor (BP) 10. The baseband processor (BP) 10 enters into a low power mode (LPM) during intervals between the defined scanning interval. At step S48, the WLAN processor (WP) 100 detects identifiers (SSIDs/BSSIDs). At step S50, the WLAN processor (WP) 100 compares each detected identifier (SSID/BSSID) to the preferred identifiers (SSIDs/BSSIDs) to determine whether one of the detected identifiers (SSIDs/BSSIDs) matches one of the preferred identifiers (SSIDs/BSSIDs). At step S52, detected identifiers (SSIDs/BSSIDs) which do not match one of the preferred identifiers (SSIDs/BSSIDs) are ignored. At step S54, if the WLAN processor (WP) 100 finds a match between one of the detected identifiers (SSIDs/BSSIDs) and one of the preferred identifiers (SSIDs/BSSIDs), a wake-up command (WUC) is sent to the baseband processor (BP) 10 to awaken the baseband processor (BP) 10.

Figure 5:
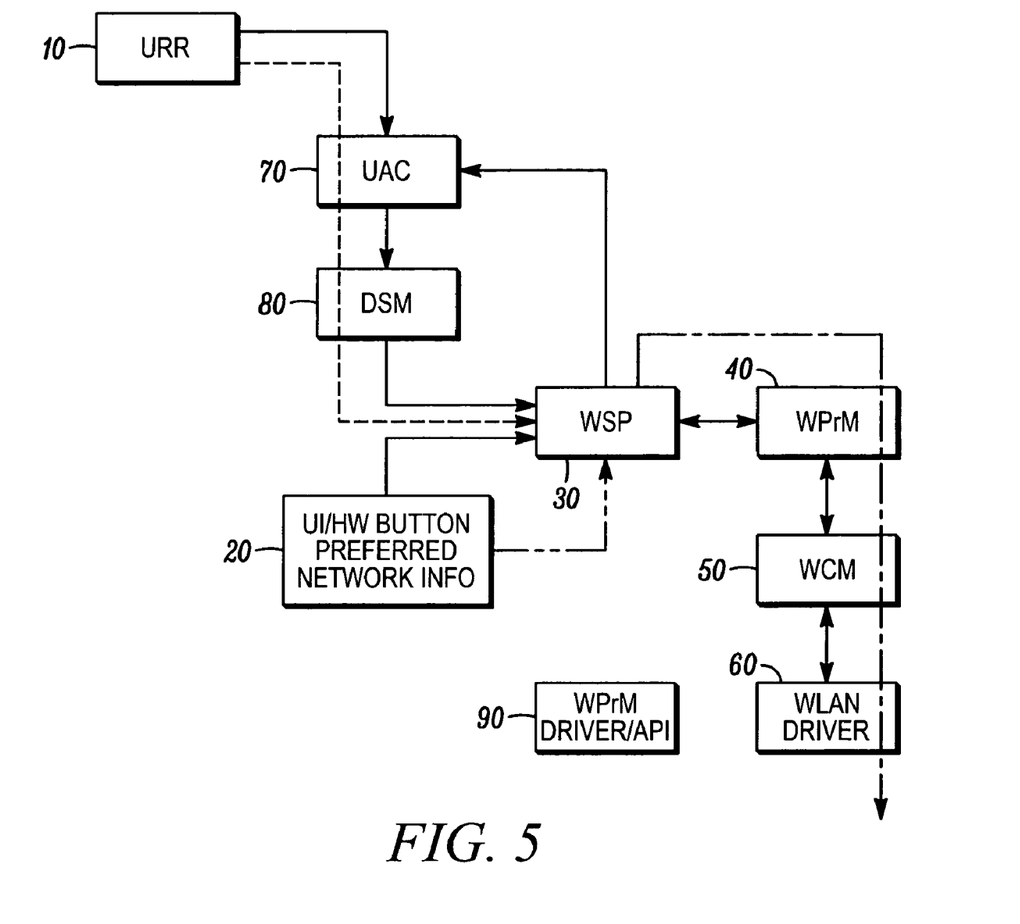
FIG. 5 is a block diagram a a baseband processor and a WLAN processor in a UMA network while the WCD operates in a GSM mode of operation.

FIG. 5 is a block diagram which illustrates an implementation of the baseband processor (BP) 10 and the WLAN processor (WP) 100 and the message flows between various components and modules of the baseband processor (BP) 10 and WLAN processor (WP) 100 in a UMA network while the WCD operates in either the GSM preferred mode of operation or the GSM only mode of operation.

The WCD of FIG. 5 comprises a UMA Radio Resource Controller (URR) 10, User Interface (UI)/Hardware (HW) button 20, Wireless Service Provider (WSP) 30, Wireless Power Management module (WPrM) 40, Wireless Connection Management module (WCM) 50, Wireless Local Area Network (WLAN) Driver module 60, UMA Application Client (UAC) 70, Deep Sleep Module (DSM) 80, and WLAN Power Management Driver module (WPrM Driver/API) 90. The part of Radio Resource Controller (URR) 10 is shared in the baseband processor (BP) 10, whereas all other modules 40-90 are part of the WLAN processor (WP) 100. Normally, when "continuous" scanning is implemented all of the blocks in FIG. 5 would need to be awakened each time a scan takes place.

The Radio Resource Controller (URR) 10, among other functions, controls GSM or WiFi handover, and also determines whether the WCD should be in GSM mode or WiFi mode. The Radio Resource Controller (URR) 10 also generates the data download command (DDC), the private scan command (PSC), and optionally a configure wake-up command (CWUC). These commands or "application programming interfaces (APIs)", can be used by the application processor to implement "private" scanning, which is independent of host interaction, within WLAN processor 100. In this description, the terms "command," "API," and Ioctl are used interchangeably to refer to protocols used to communicate between two software modules. The API commands described below are merely exemplary formats, but other alternative formats can also be used.

When the baseband processor 10 enters deep sleep mode, a "private scan" command can be sent to firmware in the WLAN processor 100 to inform the WLAN processor 100 that the baseband processor 10 is entering deep sleep mode, and that the WLAN processor 100 should automatically and independently begin private scanning a pre-determined number (e.g., 11 or 13) channels at a pre-defined or user-defined scanning interval without waiting for a scan command from the host baseband processor 10. In other words, the WLAN processor 100 should start scanning independent of the host processor 10. The private scan command may have the following format:

```
CmdCode UINT16 CMD_802_11_Priv_Scan
Action UINT16 WLAN start private scan at interval TSCAN
TSCAN UINT16 timing of automatic interval set to TSCAN in sec
```

Here, the field TSCAN allows the user to set the scanning interval. In between scanning intervals the whole chipset should go into a low power mode. In low power mode, the WLAN processor 100 scans the pre-determined number (e.g., 11 or 13) channels and then enters into IEEE Psave mode. The number of channels to be scanned depends upon the type of WLAN or UMA network. For example, in North America or Europe and other locations where WLANs which comply with 802.11(b) and 802.11(g) WLAN standards, the number of channels would be 11, whereas in WLANs which comply with Japanese WLAN standards, the number of channels would be 13.

The "data download" command comprises user-selected, preferred SSID/BSSID information corresponding to the preferred network list, and defines scanning criteria to be used by the WLAN processor 100. The preferred network list can be a series of preferred networks from a host. The data download command may take the following format:

```
CmdCode UINT16 CMD_802_11_Pref_Network
Data SSID UINT96 Host sends upto 6 network SSID/BSSID
```

In response to the private scan command, the WLAN processor 100 scans 11 channels and for each SSID/BSSID the WLAN processor 100 detects, the WLAN processor 100 compares it to the preferred SSID/BSSID information selected by the user. Typically, many of the detected SSIDs/BSSIDs will not be on the preferred list and these are ignored by the WLAN processor 100. However, if the WLAN processor 100 finds a match between the detected SSID/BSSID and one of the preferred SSIDs/BSSIDs, then the WLAN processor 100 awakens the host baseband processor 10. In the format above, for example, if any of the preferred networks, for example, the Data SSIDs, is matched with the result of private scan command, then the WLAN processor 100 should set Host Wakeup Criteria true.

The "host wake-up configure" command typically defines the criteria specifying when the host baseband processor 10 should be awakened. In this implementation, the "host wake-up configure" command has been modified to specify that the host baseband processor 10 should be awoke when the wake-up host data SSID matches the private scan command. Alternatively, the function of this implementation could be a new command that performs a similar functionality. This command can be implemented, for example, using the following format:

```
CmdCode UINT16 CMD_802_11_Host_Wakeup
Criteria UINT16 Criteria to wakeup host
Additional Criteria
* Wakeup Host if DataSSID matches Private Scan Command
```

The Wireless Power Management module (WPrM) 40 and the WLAN Power Management Driver module (WPrM Driver/API) 90 cooperate to make WLAN power management decisions. The Wireless Connection Management module (WCM) 50 connects to all audio codecs and voice applications. The WLAN Driver module 60 provides an interface which connects to baseband processor.

The Wireless Service Provider (WSP) 30 receives the preferred network selected by the user and decides whether or not the WCD 150 should handover or start scanning based on the user input. Once the baseband processor 10 goes into DSM, the Wireless Service Provider (WSP) 30 uses the data-download command to pass the preferred network scanning information from the host baseband processor 10 to the WLAN processor 100 along with the host wake-up configure command for the WLAN chipset to awaken the baseband processor only if the WLAN chipset detects a preferred network (SSID/BSSID) and should handover to a VoIP network.

The WLAN driver 60 is connected to a WLAN firmware module 110 which is connected to a WLAN RF module 120. The WLAN firmware module 110 and the WLAN RF module 120 reside on the WLAN processor 100. Host independent scanning is done in WLAN firmware module 110 which also decides if the scanned SSIDs match one of the SSIDs on the preferred list.

Exemplary WCD Scanning Techniques

The following exemplary WCD scanning techniques describe four user selectable modes of WCD operation. These four modes are referred to as GSM only mode, GSM preferred mode, UMA preferred mode and UMA only mode. In GSM only mode, the WCD scans for a GSM network; a UMA network is not required. In GSM preferred mode, at power-up, the WCD scans for a GSM network, and if it cannot find a GSM network, then it will scan for a UMA network. In UMA preferred mode, at power-up, the WCD starts scanning for access points of the UMA network, and if it cannot find a UMA network, then it will scan for a GSM network. In UMA only mode, the WCD only scans for access points associated with the UMA network.

In the following description, two exemplary WCD scanning techniques will be discussed. One of the exemplary WCD scanning techniques applies in situations where the WCD operates in either the GSM preferred or GSM only modes. The other exemplary WCD scanning techniques apply in situations where the WCD operates in either the UMA preferred and UMA only modes.

GSM Preferred and GSM Only Modes

When the WCD is in GSM environment and no UMA service is available, the following can be the criteria used for WLAN status. In GSM preferred and GSM only modes, the WLAN chipset 100 will be in deep sleep mode and no automatic passive or active scanning of WLAN/UMA network will be supported. In either mode, if a user wants to scan for WLAN/UMA network, the user manually presses the WLAN button (Hardware (HW) button 20) or goes through User Interface (UI) 20 to select a scanning option.

At step S1, the User Interface (UI) 20 module will send SCAN command to the Wireless Service Provider (WSP) 30 together with the Radio Resource Controller (URR) 10. At step S2, the Wireless Service Provider (WSP) 30 sends a request from the Wireless Power Management module (WPrM) 40 to the Wireless Connection Management module (WCM) 50 to the Wireless Local Area Network (WLAN) Driver module 60. At step S3, the driver of the baseband processor sends "DEEPSLEEP Exit" ioctl either through a power up interrupt/command through SD interface to wake up WLAN device or it can send an interrupt/command through GPIO21 Host_Wake_WLAN to wake up WLAN firmware. At step S4, when the WLAN firmware receives this interrupt it sends a Host Awake event to the baseband processor. At step S5, the baseband processor responds to the Host Awake by sending a Wakeup confirm. At step S6, the Wireless Local Area Network (WLAN) Driver module 60 returns scan results to the Wireless Service Provider (WSP) 30 where a comparison of scan results is done. The UAC 70 provides the association thresholds to the Wireless Service Provider (WSP) 30.

At step S7, once the policy is met and based on scan result SNR/Link Quality meets the threshold requirements, the connection request is initiated from DSM to the Wireless Service Provider (WSP) 30. At step S8, the Wireless Service Provider (WSP) 30 replies to DSM with a "connection confirm" response. At step S9A, if the scan command does not return satisfactory results required for the comparison policy in the Wireless Service Provider (WSP) 30 after doing scan a predetermined number of times (e.g., three times), then the Wireless Local Area Network (WLAN) Driver module 60 sends "DEEPSLEEP Enter" ioctl/command and WLAN firmware puts WLAN hardware into deep sleep mode until user wakes it up again, via the User Interface (UI)/Hardware (HW) button 20. In this mode battery life is dominated by GSM talk time and GSM standby time unless GSM coverage is so poor that a user is forced to use UMA.

UMA Preferred and UMA Only Modes

Figure 6:
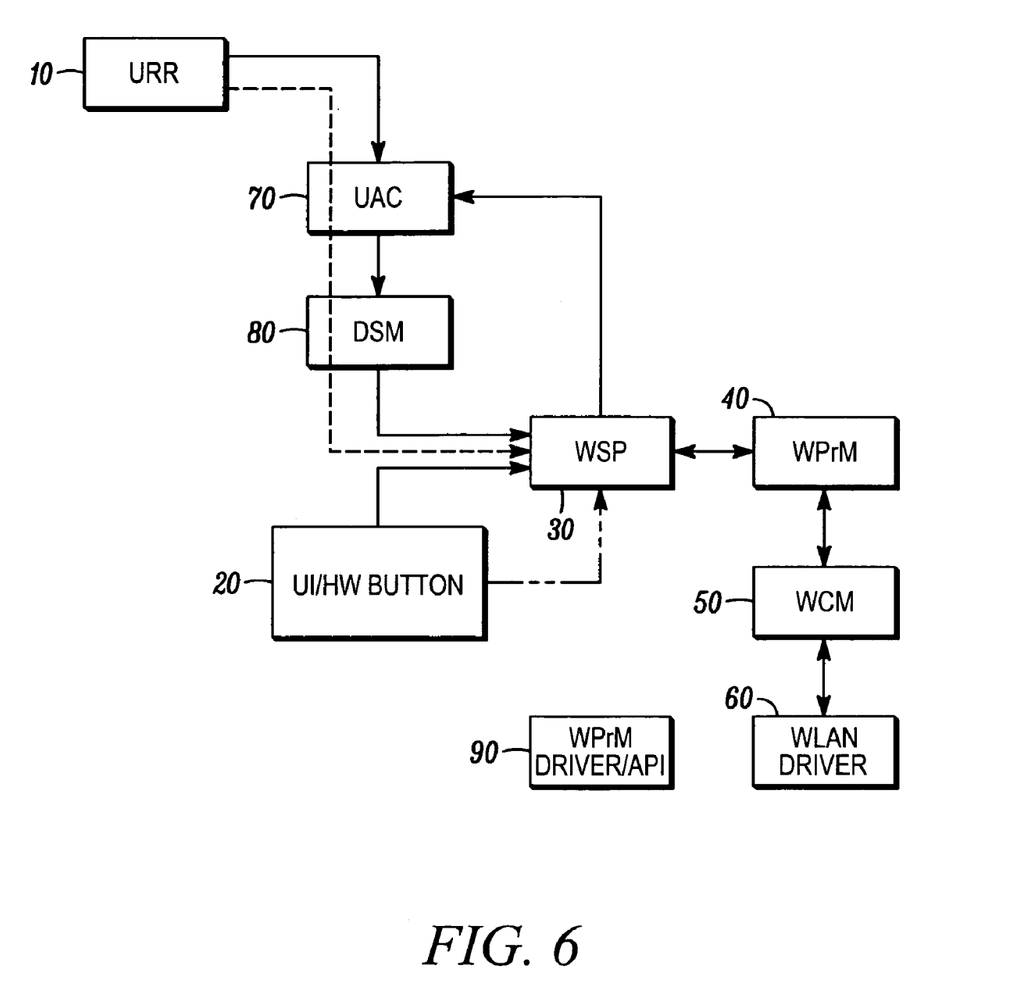
FIG. 6 is a block diagram message flows between a baseband processor and a WLAN processor in a UMA network while the WCD operates in a UMA mode of operation.

FIG. 6 is a block diagram which illustrates an implementation of the baseband processor (BP) and the WLAN processor (WP) and the message flows between various components and modules of the baseband processor (BP) and WLAN processor (WP) in a UMA network while the WCD operates in either the UMA preferred mode of operation or the UMA only mode of operation. The WCD of FIG. 6 includes the same blocks and similar interconnections. In addition, steps S1-S8 described above with reference to FIG. 5 are equally applicable in FIG. 6. For sake of brevity, the description of FIG. 5 and steps S1-S8 will not be repeated.

In FIG. 6, at step S9B, if the scan command does not return satisfactory results required for comparison policy in WSP after doing scan a predetermined number of times (e.g., three times), the Wireless Local Area Network (WLAN) Driver module 60 sends "WLAN_Priv_Scan" ioctl/command together with preferred network command, and based on these commands, the WLAN processor 100 scans after predetermined time (e.g., 30 seconds) without any host support. At step S10, the baseband processor 10 can sleep after it sends wake up criteria for the baseband processor 10. At step S11, if the WLAN processor 100 matches preferred network at any time during scanning, then wake up criteria for the baseband processor 10 is set to "true", and the WLAN processor 1001 wakes up the baseband processor 10 for association and authentication to start. In this mode battery life is dominated by the scan interval (e.g., 30 seconds), but a user may want to scan less frequently (e.g., every 5-10 minutes) if GSM coverage is good.

Thus, according to one aspect of this disclosure, techniques are provided for host independent scanning on a dual mode WCD's preferred BSSIDs or SSIDs. The scanning functionality can be shifted from a main host baseband processor to a secondary WLAN processor. API's are provided which allow for private scanning of preferred networks without disturbing the WCD application processor which otherwise consumes a lot of current. Additional or enhanced software commands are provided which the host baseband processor can send to start host independent scanning based on previous knowledge of host wakeup criteria and host preferred WLAN networks. One exemplary command enables periodic WLAN scans without waking up the host baseband processor based on scanning time intervals and SSID information received from WLAN access points. The host can save several profiles and based on this information, a WLAN will only wake up host if it detects preferred profile. Consequently, if the WCD does not enter a UMA preferred network profile, then the WCD can allow host baseband processor to enter a deep sleep mode in which the host baseband processor is deactivated thereby saving and helping optimize battery life. By contrast, if the WCD does enter a UMA preferred network, then the WCD will detect it and try to associate to it since the WLAN chipset will be doing low power background scans.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless communication device configured to scan for an access point, comprising:
    a baseband processor configured to generate a data download command comprising a preferred network list comprising a list of preferred network identifiers associated with access points to be scanned for, and a first scan command when the baseband processor enters deep sleep mode; and
    a WLAN processor configured to receive the data download command and the first scan command, wherein the first scan command informs the WLAN processor that the baseband processor is entering deep sleep mode and triggers the WLAN processor to independently begin scanning a number channels corresponding to the preferred network identifiers while the baseband processor is deactivated.

2. A wireless communication device according to claim 1, wherein the preferred network list defines scanning criteria for use by the WLAN processor comprising a defined scanning interval.

3. A wireless communication device according to claim 1, wherein the WLAN processor, responsive to the first scan command, is configured to begin periodically scanning the number channels for each preferred identifier at the defined scanning interval.

4. A wireless communication device according to claim 3, wherein the baseband processor is configured to enter into a lowest power mode during intervals between the defined scanning interval.

5. A wireless communication device according to claim 3, wherein the WLAN processor is configured to detect network identifiers and compare each detected network identifier to the list of preferred network identifiers to determine whether the detected network identifiers match one of the preferred network identifiers.

6. A wireless communication device according to claim 5, wherein the WLAN processor is configured to generate a wake-up command for the baseband processor if the WLAN processor finds a match between one of the detected network identifiers and one of the preferred network identifiers.

7. A wireless communication device according to claim 6, wherein the WLAN processor is configured to ignore detected network identifiers which do not match one of the preferred network identifiers.

8. A wireless communication device according to claim 5, wherein the baseband processor remains in the deep sleep mode until one of the preferred network identifiers is detected by the WLAN processor.

9. A wireless communication device according to claim 1, wherein the preferred network identifiers comprise preferred service set identifiers (SSIDs).

10. A wireless communication device according to claim 1, wherein the preferred network identifiers comprise preferred basic service set identifiers (BSSIDs).

11. A wireless communication device according to claim 1, wherein the preferred network identifiers are selected by a user.

12. A wireless communication device according to claim 1, wherein the first scan command triggers the WLAN processor to independently begin scanning while the baseband processor is deactivated without receiving other commands from the baseband processor, wherein the WLAN processor enters a power save mode after scanning the number of channels.

13. A wireless communication device configured to scan for an access point, comprising:
    a baseband processor configured to generate a data download command comprising a preferred network list comprising a list of preferred network identifiers associated with access points to be scanned for, a first scan command, and wherein the baseband processor is configured to send a configure wake-up command; and
    a WLAN processor configured to receive the data download command and the first scan command, wherein the first scan command triggers the WLAN processor to independently begin scanning a number channels corresponding to the preferred network identifiers while the baseband processor is deactivated, wherein the configure wake-up command defines when the WLAN processor generates a wake-up command for the baseband processor.

14. A wireless communication device according to claim 13, wherein the baseband processor is configured to generate the configure wake-up command for the WLAN processor which specifies that the baseband processor is to be awakened when one of the detected network identifiers matches one of the preferred network identifiers.

15. A method of scanning for an access point with a wireless communication device comprising a baseband processor and a WLAN processor, the method comprising:
    sending a data download command from the baseband processor to the WLAN processor, wherein the data download command defines a preferred network list comprising a list of preferred network identifiers associated with access points to be scanned for; and
    sending, when the baseband processor enters deep sleep mode, a first scan command from the baseband processor to a firmware module of the WLAN processor, wherein the first scan command indicates that the baseband processor is entering deep sleep mode and triggers the WLAN processor to independently begin scanning a number channels corresponding to the preferred network identifiers at a defined scanning interval while the baseband processor is deactivated.

16. A method according to claim 15, wherein the preferred network list defines scanning criteria for use by the WLAN processor.

17. A method according to claim 15, wherein the first scan command triggers the WLAN processor to begin periodically scanning the number channels for each preferred network identifier at the defined scanning interval without waiting for a second scan command from the baseband processor.

18. A method according to claim 17, wherein the baseband processor enters into a lowest power mode during intervals between the defined scanning interval.

19. A method according to claim 17, the method further comprising:
   detecting one or more network identifiers at the WLAN processor; and
   comparing each detected network identifier to the list of preferred network identifiers to determine whether one of the detected network identifiers matches one of the preferred network identifiers.

20. A method according to claim 19, the method further comprising:
   sending a wake-up command to the baseband processor if the WLAN processor finds a match between one of the detected network identifiers and one of the preferred network identifiers.

21. A method according to claim 20, the method further comprising:
   ignoring detected network identifiers at the WLAN processor which do not match one of the preferred network identifiers.

22. A method according to claim 15, the method further comprising:
   sending a configure wake-up command from the baseband processor to the WLAN processor, wherein the configure wake-up command defines when a wake-up command is to be sent to the baseband processor.

23. A method according to claim 22, the method further comprising:
   sending the configure wake-up command from the baseband processor to the WLAN processor, wherein the configure wake-up command specifies that the baseband processor is to be awakened when one of the detected network identifiers matches one of the preferred network identifiers.

24. A method according to claim 15, wherein the preferred network identifiers comprise preferred service set identifiers (SSIDs).

25. A method according to claim 15, wherein the preferred network identifiers comprise preferred basic service set identifiers (BSSIDs).

26. A method according to claim 15, wherein the preferred network identifiers are selected by a user.

27. A wireless communication device configured to scan for an access point in accordance with a user-defined scan interval, the wireless communication device comprising:
   a WLAN processor; and
   a baseband processor configured to generate:
      a data download command comprising a preferred network list comprising a list of preferred network identifiers associated with access points to be scanned for and scanning criteria for use by the WLAN processor including the user-defined scanning interval, and
      a first scan command when the baseband processor enters deep sleep mode,
   wherein the WLAN processor is configured to:
      receive the data download command and the first scan command, wherein the first scan command informs the WLAN processor that the baseband processor has entered deep sleep mode;
      scan, in response to the first scan command, a number channels corresponding to the preferred network identifiers associated with access points to be scanned for according at the user-defined scanning interval.

28. A wireless communication device according to claim 27, wherein the baseband processor is configured to enter into a lowest power mode during intervals between the user-defined scanning interval.

29. A wireless communication device according to claim 27, wherein the WLAN processor is configured to:
   detect network identifiers; and
   determine whether the detected network identifiers match one of the preferred network identifiers.

30. A wireless communication device according to claim 27, wherein the baseband processor is configured to:
   generate a configure wake-up command for the WLAN processor which specifies that the baseband processor is to be awakened when one of the detected identifiers matches one of the preferred network identifiers; and
   send a configure wake-up command that defines when the WLAN processor generates a wake-up command for the baseband processor.

31. A wireless communication device according to claim 30, wherein the WLAN processor is configured to:
   generate a wake-up command for the baseband processor if the WLAN processor finds a match between one of the detected network identifiers and one of the preferred network identifiers.

32. A wireless communication device according to claim 27, wherein the preferred network identifiers comprise preferred service set identifiers (SSIDs).

33. A wireless communication device according to claim 27, wherein the preferred network identifiers comprise preferred basic service set identifiers (BSSIDs).

34. A wireless communication device according to claim 27, wherein the preferred network identifiers are selected by a user.

* * * * *